United States Patent [19]

Durston et al.

[11] 4,046,629
[45] Sept. 6, 1977

[54] NUCLEAR REACTORS

[75] Inventors: John Graham Durston, Northwich; John Richard Hind, Warrington, both of England

[73] Assignee: United Kingdom Atomic Energy Authority, London, England

[21] Appl. No.: 699,222

[22] Filed: June 23, 1976

[30] Foreign Application Priority Data
July 7, 1975   United Kingdom .............. 28533/75

[51] Int. Cl.$^2$ .............................................. G21C 9/00
[52] U.S. Cl. ...................................... 176/38; 176/40; 176/50; 176/65
[58] Field of Search ...................... 176/87, 40, 50, 61, 176/64, 65, 37, 38

[56] References Cited
U.S. PATENT DOCUMENTS

| 3,489,206 | 1/1970 | Lecourt ................................. 176/87 |
| 3,975,879 | 8/1976 | Birch et al. ........................... 176/87 |

FOREIGN PATENT DOCUMENTS

| 1,187,304 | 4/1970 | United Kingdom ................... 176/87 |
| 1,147,950 | 4/1969 | United Kingdom ................... 176/87 |

Primary Examiner—Samuel W. Engle
Assistant Examiner—Ralph Palo
Attorney, Agent, or Firm—Larson, Taylor and Hinds

[57] ABSTRACT

Thermal insulation for a core tank of a fast breeder nuclear reactor comprises a plurality of spaced membranes defining a series of concentric chambers lining the tank. Liquid metal is pumped from the cooler regions of a pool of coolant into the first chamber from which it flows successively through the remaining chambers towards the reactor core.

2 Claims, 3 Drawing Figures

NUCLEAR REACTORS

BACKGROUND OF THE INVENTION

This invention relates to nuclear reactors and is primarily directed to liquid metal cooled nuclear reactors.

One known kind of liquid metal cooled nuclear reactor comprises a nuclear reactor core submerged in a pool of liquid sodium contained by a primary vessel within a concrete vault. The core is supported on a diagrid and enclosed by a shroud or core tank and coolant is circulated from outside the core tank by a pump upwardly through the reactor core thence to a heat exchanger from which the coolant is discharged back to the region of the pool which is outside the core tank. The temperature of the pool outside the core tank is approximately 400° whilst that inside the core tank is approximately 600° C.

To reduce heat transfer from the inner to the outer region of the pool and to protect the wall of the core tank from the stress effects of such a large temperature differential it is necessary to provide thermal insulation for the inner wall, that is, the hot wall, of the tank. In the known kind of liquid metal cooled nuclear reactor the insulation has been of the passive kind, that is, cladding of the kind which has a low heat transfer characteristic and has taken such form as a gas filled quilted envelope made from thin stainless steel material. However, such insulation is unreliable and requires testing for gas tightness by complex techniques. In a recently proposed construction of liquid metal nuclear reactor passive insulation for the wall of the core tank comprises a cladding layer of closely packed and intersealed stainless steel blocks and a stainless steel membrane spaced from the layer of blocks. The membrane is provided with a network of intersecting corrugations to accommodate thermal expansion of the membrane but it is feared that the complex stresses induced at the knots of the orthogonal corrugations will give rise to unreliability.

It is an object of the present invention to develop insulation means for the core tank of a liquid metal cooled nuclear reactor wherein the liquid metal coolant plays a more active part in the insulation and thereby reduces the complexity of manufacture and improves the reliability of the insulation.

SUMMARY OF THE INVENTION

According to the invention, in a liquid metal cooled nuclear reactor comprising a primary vessel containing a pool of liquid metal and a nuclear reactor core submerged in the pool of liquid metal and enclosed by a core tank there is means for enveloping the inner wall surface of the core tank with liquid metal drawn from the pool region outside of the core tank and for flowing the liquid metal thence radially inwardly towards the reactor core. The invention provides that the inner wall surface of the core tank is cooled by contact with relatively cool liquid metal and that the subsequent radially inward flow of liquid metal repels the outward transfer of heat to the inner wall surface of the core tank.

The means for enveloping the inner wall surface of the core tank with liquid metal drawn from the pool region outside of the core tank and for flowing the liquid metal thence radially inwardly may comprise a continuous membrane spaced from the inner wall surface of the core tank thereby defining a compartment bounded by the inner wall surface of the core tank and the membrane, the membrane having a plurality of distributed perforations, and a pump having an inlet port submerged in the pool of liquid metal outside of the core tank and an outlet port disposed for discharging liquid metal into the compartment. However, in a preferred construction there is a plurality of spaced membranes having distributed perforations and defining a radial series of compartments through which liquid metal from the discharge port can flow sequentially. The membranes may have a network of intersecting corrugations to accommodate thermal expansion, the perforations being slits provided at the intersections of the corrugations but in a preferred construction the corrugations of a first group of parallel corrugations are intermittently interrupted to avoid the possibility of complex stresses being induced at the knots. A constructional example of liquid metal cooled nuclear reactor embodying the invention is described with reference to the accompanying drawings wherein, FIG. 1 is a fragmentary side view in section,
FIG. 2 is a perspective view of a detail, and
FIG. 3 is a sectional view of the construction.

DESCRIPTION OF THE PREFERRED EMBODIMENTS

Figure 3:
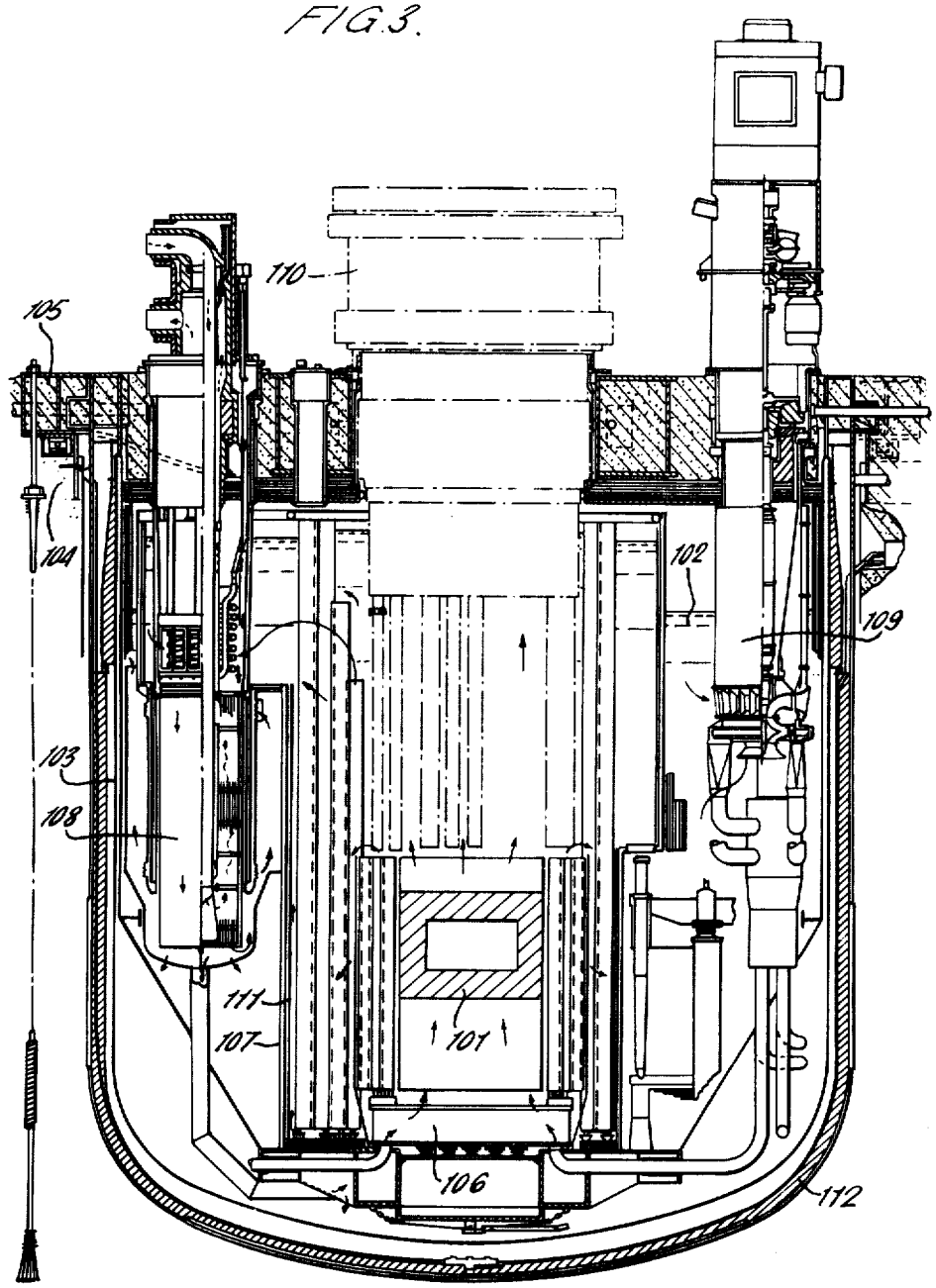

In the nuclear reactor construction shown in FIG. 3 a fast breeder nuclear reactor core 101 is submerged in a pool 102 of liquid sodium contained within a primary vessel 103. The vessel 103 is housed in a concrete containment vault 104 having a cover 105 from which the primary vessel 103 depends. The reactor core is carried by a diagrid 106 which is supported from the cover 105 and the reactor core is housed within a shroud or core tank 107. The cover has numerous penetrations for ancillary equipment such as heat exchangers 108 and circulators 109 and has a central rotating shield 110. The rotating shield 110 comprises an outer rotatable member having an inner rotatable member mounted eccentrically in it, there being penetrations in the shield for control mechanisms and to provide access to fuel assemblies in the core. In use, coolant is circulated from the pool region outside of the core tank 107 through the core 101 by way of the diagrid and thence through the core tank 107 back to the pool region outside of the core tank by way of the heat exchangers 108. The primary vessel 103 is spaced from the wall of the concrete vault and thermal insulation is interposed between vessel and vault wall. The temperature of the sodium in the outer region of the pool is approximately 400° C and the temperature of the sodium within the core tank is approximately 600° C so thermal insulation 111 is provided for the inner wall that is, the hot wall, of the core tank.

Figure 1:
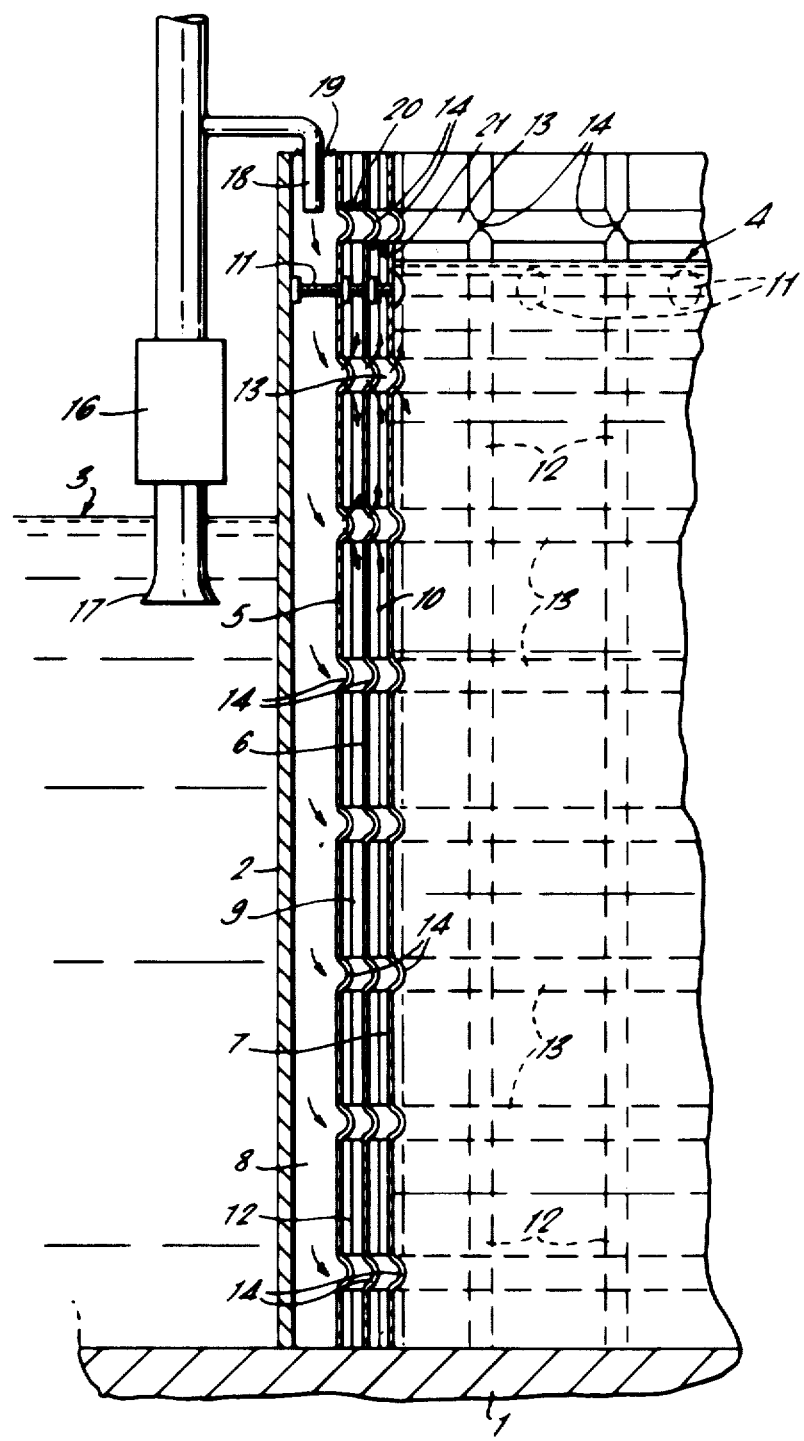

Referring now to FIG. 1, there is shown therein a fragment of the core tank 107 having a base designated 1. The level of the liquid metal in the outer part of the primary vessel 103 is indicated by the reference numeral 3 and the level within the core tank 107 is indicated by reference numeral 4, the level 4 being higher than the level 3 due to the pressure drop in the reactor cooling system, whereby sodium pumped through the core passes from the core tank to the primary heat exchangers 108 before being returned to the outer region of the pool which feeds the inlets of the pumps. Thus the sodium in the core tank 107 having just passed through the core, which is the best source of the power producing system, is hotter than that on the outside of the core tank. The insulation 111 takes the form of a plurality of similar membranes, conveniently of stainless steel, three being shown in the illustrated example designated respectively 5, 6 and 7. The first membrane 5 is spaced from the wall of the core tank 107 to provide a space or compartment 8, the second membrane 6 is spaced from the membrane 5 to provide a space or compartment 9, the latter being of smaller width than compartment 8, and the outer membrane 7 is spaced from the membrane 6 similarly to the spacing between membranes 5 and 6 to provide a space or compartment 10. The core is cylindrical, the core tank 107 is also cylindrical, and the membranes are similarly shaped, thereby providing annular compartments 8, 9 and 10. Other shapes of core, core tank and membranes are of course possible but cylindrical is found to be the most convenient and is almost invariably employed.

Figure 2:
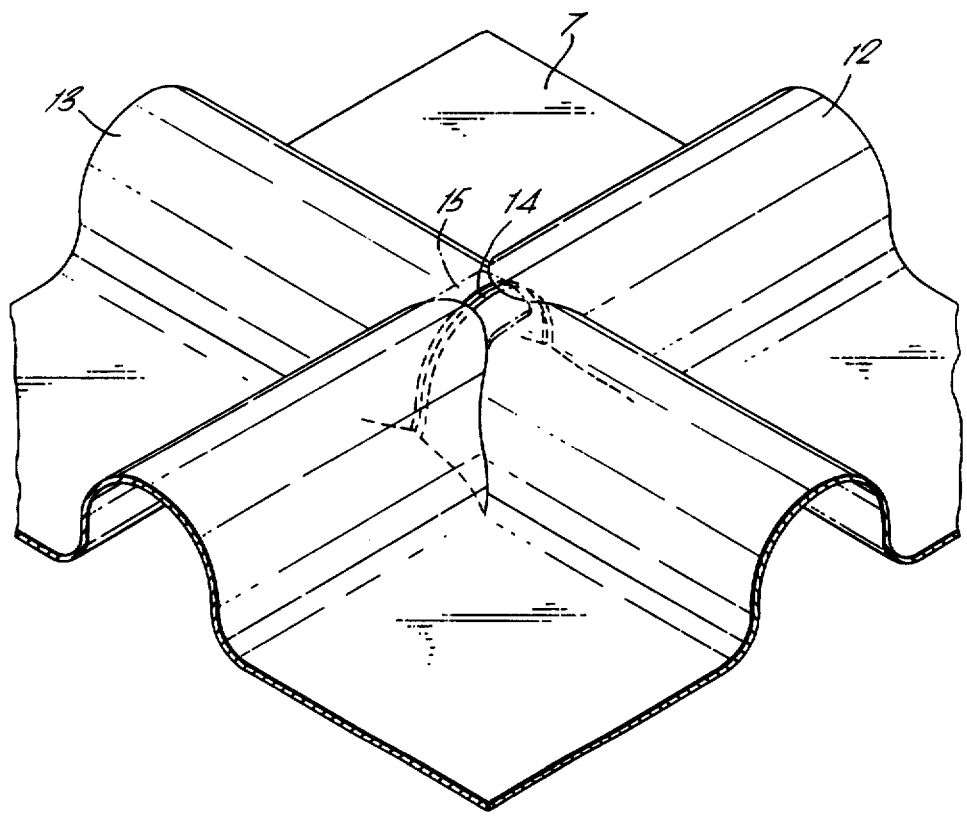

The membranes 5, 6 and 7 are mounted on the wall of the core tank 107 and spaced apart by means of fixing studs 11, three only at a single level being shown for the sake of clarity, it being appreciated they are provided at several levels as expedient. The wall thickness of the membranes 5, 6 and 7 are relatively small compared with the thickness of the core tank wall (1 mm compared with 20 mm in a typical example). It is preferable to impart some flexibility to the membranes by providing a network of corrugations conveniently intersecting at right angles and arranged vertically and horizontally. The vertical corrugations on the outer membrane 7 are designated 12 and the horizontal corrugations 13. At every position at which these corrugations cross, a perforation through the respective membrane is provided for intercommunication between the compartments, and the perforations conveniently consist in slits in one of the corrugations (see FIG. 2). The slits designated 14 FIGS. 1 and 2 are in the horizontal corrugations 13. In a modification, shown in dot-and-dash lines in FIG. 2, each of the interrupted corrugations (the vertical corrugations 12 in FIGS. 1 and 2) is so formed that a flap 15 extends over the highest point of the slits 14 in a hooding manner so as to interrupt radially outward flow of fluid through the slits 14 and divert the flow laterally with flow direction components more parallel to the membrane surfaces (and in several such directions) than radial.

In order to promote movement of cool sodium through the compartments 8, 9 and 10, a sodium pump, preferably electromagnetic, illustrated diagrammatically in FIG. 2 and designated 16, is provided with an inlet 17 dipping into the cool sodium in the tank, and an outlet 18 over (as shown) or through the core tank wall to feed cool sodium to compartment 8. The levels of the sodium in compartments 8, 9 and 10 are designated 19, 20 and 21 respectively. The level difference across a membrane represents the pressure difference required to drive sodium through the slits 14. Sodium passes through the slits 14 at every level and with several flow directional components as aforesaid, and as illustrated by the flow direction arrows at some of the slits 14 in FIG. 1 to pass to compartment 9 and to compartment 10, finally joining the hot sodium in the core tank, and being more or less at the same temperature when it does, by reason of its having taken heat from the membranes and the sodium contained in the compartments between them. Thus very little of the heat passing through diaphragm 7 reaches the core tank 107, the majority of the heat being taken back into the core tank by sodium flowing through the membranes.

We claim:

1. A liquid metal cooled nuclear reactor comprising,
    a primary vessel containing a pool of liquid metal, a nuclear reactor core submerged in the pool of liquid metal,
    a core tank immersed in the pool of liquid metal and enclosing the reactor core,
    a continuous membrane spaced from the inner wall surface of the core tank thereby defining a first compartment bounded by the inner wall surface of the core tank and the membrane,
    a plurality of continuous membranes defining a series of second compartments, the series extending radially inwardly from the first compartment, the membranes having a network of intersecting corrugations, each one of a first group of parallel corrugations being continuous and each one of a second group of parallel corrugations orthogonal to the first group being formed intermittently, the ends of the intermittent sections of the corrugations being profiled to follow the corrugations of the first group, the corrugations of the first group being perforated by slits at the intersections of the corrugations, and
    a pump having an inlet port submerged in the pool of liquid metal outside of the core tank and an outlet port disposed for discharging liquid metal into the first compartment whereby liquid metal is able to be flowed from the outlet port sequentially through the chambers by way of the perforations.

2. A liquid metal cooled nuclear reactor according to claim 1 wherein the ends of the intermittent sections of the corrugations of the second group profiled to follow the corrugations of the first group also define a flap hooding the slit perforations.

* * * * *